United States Patent
Lumezanu et al.

(10) Patent No.: US 9,106,576 B2
(45) Date of Patent: Aug. 11, 2015

(54) POLICY-AWARE BASED METHOD FOR DEPLOYMENT OF ENTERPRISE VIRTUAL TENANT NETWORKS

(71) Applicant: NEC Laboratories America, Inc., Princeton, NJ (US)

(72) Inventors: Cristian Lumezanu, East Windsor, NJ (US); Guofei Jiang, Princeton, NJ (US); Kai Chen, Hong Kong (CN); Yueping Zhang, Princeton, NJ (US); Vishal Singh, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 240 days.

(21) Appl. No.: 13/740,229

(22) Filed: Jan. 13, 2013

(65) Prior Publication Data

US 2013/0185438 A1 Jul. 18, 2013

Related U.S. Application Data

(60) Provisional application No. 61/586,290, filed on Jan. 13, 2012.

(51) Int. Cl.
*H04L 12/725* (2013.01)
*H04L 12/46* (2006.01)
*H04L 12/24* (2006.01)
*H04L 12/911* (2013.01)

(52) U.S. Cl.
CPC .......... *H04L 45/302* (2013.01); *H04L 12/4641* (2013.01); *H04L 41/084* (2013.01); *H04L 41/0896* (2013.01); *H04L 45/306* (2013.01); *H04L 47/70* (2013.01)

(58) Field of Classification Search
CPC ..... H04L 41/12; H04L 45/02; H04L 12/4641; H04L 45/00; H04L 63/0272; H04L 2012/5632; H04L 2012/5636; H04L 41/065
USPC .......................................................... 709/226
See application file for complete search history.

(56) References Cited

U.S. PATENT DOCUMENTS

| | | |
|---|---|---|
| 8,787,154 B1 * | 7/2014 | Medved et al. ............... 370/225 |
| 2008/0049630 A1 * | 2/2008 | Kozisek et al. ............... 370/250 |
| 2012/0014284 A1 * | 1/2012 | Ranganathan et al. ........ 370/254 |
| 2012/0144066 A1 * | 6/2012 | Medved et al. ............... 709/242 |
| 2013/0132542 A1 * | 5/2013 | Zhang ........................... 709/223 |
| 2014/0195666 A1 * | 7/2014 | Dumitriu et al. ............. 709/223 |
| 2014/0365664 A1 * | 12/2014 | Yeow et al. ................... 709/226 |

* cited by examiner

*Primary Examiner* — Joseph E Avellino
*Assistant Examiner* — Rachel J Hackenberg
(74) *Attorney, Agent, or Firm* — Joseph Kolodka

(57) ABSTRACT

A method for policy-aware mapping of an enterprise virtual tenant network includes receiving inputs from a hosting network and tenants, translating resource demand and policies of the tenants into a network topology and bandwidth demand on each link in the network; pre-arranging a physical resource of a physical topology for clustering servers on the network to form an allocation unit before a VTN allocation; allocating resources of the hosting network to satisfy demand of the tenants in response to a VTN demand request; and conducting a policy aware VTN mapping for enumerating all feasibly resource mappings, bounded by a predetermined counter for outputting optimal mapping with policy-compliant routing paths in the hosting network.

8 Claims, 2 Drawing Sheets

(a) Tenant input          (b) VTN representation

US 9,106,576 B2

POLICY-AWARE BASED METHOD FOR DEPLOYMENT OF ENTERPRISE VIRTUAL TENANT NETWORKS

RELATED APPLICATION INFORMATION

This application claims priority to provisional application No. 61/586,290 filed Jan. 13, 2012, the contents thereof are incorporated herein by reference

BACKGROUND OF THE INVENTION

The present invention relates generally to networking, and more particularly, to a method for policy aware deployment of enterprise virtual tenant networks.

Recent years have witnessed an increased interest from enterprises in outsourcing their functionality to the (internal, external, or hybrid) Cloud. Current migration solutions offered by most Cloud providers are well suited for simple Web or data manipulation applications whose bottleneck affect computing resources. However, a key challenge for migrating these enterprise applications is the preservation of management policies, such as bandwidth guarantees between machines, firewall rules, load balancing schemes, and administrative requirements.

Current Cloud providers generally employ two approaches to implement these policies, i.e., hardware and software-based. Specifically, the hardware-based schemes (e.g., virtual private cloud) essentially allocate an isolated network environment for each tenant and export tenant policies to actual physical appliances. These approaches deliver high performance and excellent reliability, but are weak in flexibility and scalability and cannot support multi-tenancy. In contrast, the software based schemes are designed for shared multi-tenant environments and realize tenant appliances using virtual machine based implementations. These schemes offer excellent flexibility, but are challenged by significant performance degradation and management complexities.

Recent research efforts have recognized the need to export enterprise policies together with virtual machines. In particular, existing methods allow Cloud customers to specify bandwidth requirements between all pairs of virtual machines they request. One prior technique proposes additional policies that increase the path diversity or traffic isolation. However, all of existing approaches are tailored for the specific policies of interests and cannot be extended to more general middlebox policies, such as firewall rules that drop traffic or direct it through an IDS, and load balancer rules that distribute traffic to certain destinations.

Accordingly, there is a need for a method for policy aware deployment of enterprise virtual tenant networks that overcomes the limitations of prior efforts.

BRIEF SUMMARY OF THE INVENTION

The present invention is directed a method for policy-aware mapping of an enterprise virtual tenant network (VTN) that includes receiving inputs from a hosting network and tenants, inputs from the hosting network including topology, capacities and locations of servers and appliances and inputs from the tenants including resource requirements and policies; translating resource demand and policies of the tenants into a network topology and bandwidth demand on each link in the network; pre-arranging a physical resource of a physical topology for clustering servers on the network to form an allocation unit before a VTN allocation; allocating resources of the hosting network to satisfy demand of the tenants in response to a VTN demand request; and conducting a policy aware VTN mapping for enumerating all feasibly resource mappings, bounded by a predetermined counter for outputting optimal mapping with policy-compliant routing paths in the hosting network These and other advantages of the invention will be apparent to those of ordinary skill in the art by reference to the following detailed description and the accompanying drawings.

DETAILED DESCRIPTION

The present invention encompasses a general automated framework for policy-aware mapping of enterprise virtual tenant network (VTN) to the Cloud. Enterprises can use our approach to express a wide spectrum of system configurations, ranging from network QoS (e.g., bandwidth guarantees, path reliability, and conditional routing), to security policies (e.g., firewall and IDS settings), and to administrative rules (e.g., service isolation). We first define a network service model, in which pools of servers, firewalls, load balancers, and other resources are attached to an OpenFlow-based network. Given resource requirements (e.g., the number of servers and the capacities of the load balancers) and policies specified by the tenants, our approach automatically maps VTNs to the hosting network while preserving these policies.

This mapping process consists of three major components. The first one is input translation, which converts the tenant input into the network requirements (e.g., topology, routing, and bandwidth) of the hosting infrastructure. The second major component is resource mapping, i.e., deciding where to place each VTN resource in the hosting network. The last part is routing, which determines the optimal forwarding path for each virtual link in the VTN while preserving all associated policies. The second and third components are actually interdependent. Finding a closed-form solution to this problem is NP-hard. Instead, we approach the problem using a heuristic algorithm. In the paper, we present a brief description of this algorithm and provide a preliminary evaluation of its effectiveness.

Figure 1:
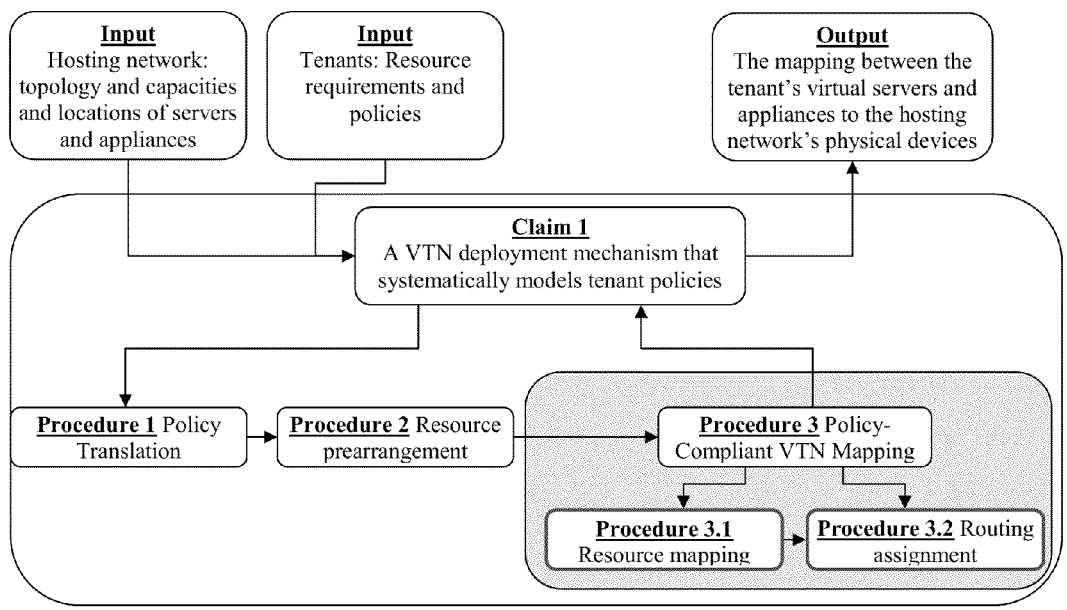
FIG. 1 is an exemplary diagram for policy aware deployment of enterprise virtual tenant networks, in accordance with the invention.

Turning now to FIG. 1, the input to the inventive method is the information about the hosting network and virtual tenants networks (VTN). For the hosting network, the required information includes the network topology, bandwidth of each link, locations and capacities of all resources, including server and middle boxes (e.g., firewall, load balancer, and intrusion detection systems). For the VTN, the user-provided information includes resource demand and policy specifications.

More specifically, looking at FIG. 1, the exemplary configuration of the inventive method includes Housing Network's inputs such as topologies, capacities and locations of servers and appliances and tenant inputs such as resource requirements and policies. The above inputs are fed to a policy translation, procedure 1, resource prearrangement procedure, which then carries over to a VTN mapping procedure. The VTN mapping includes resource mapping and routing assignment procedures and outputs the mapping between tenant's virtual servers and appliances to the Hosting Network's physical devices.

Then, the invention applies four steps to map the VTNs to the hosting networks: policy translation, physical resource arrangement, resource mapping, and route assignment.

Figure 2:
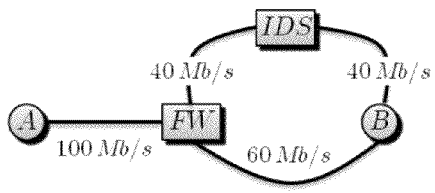
FIGS. 2(a) and (b) are diagrams showing an example of a conversion of a tenants security policy into a detailed topology, under the policy transition aspects of the invention.

Procedure 1: Policy Translation. The inventive method first reads the tenants resource demand and policies and translates them into a network topology and bandwidth demand on each link. Consider the example in FIGS. 2(a) and (b), showing conversion of the tenant's security policy into a detailed network topology, which will be the input for the next procedure, Procedure 2.

Under the physical resource prearrangement, procedure 2, to reduce the problem search space, there is first a pre-arranging of the physical resource of the physical topology before any VTN allocation takes place. The goal of pre-arrangement is to cluster servers together to form an allocation unit. There are different criteria for clustering. For example, servers close to each other are assembled together to form a cluster for efficient bandwidth utilization, or servers located under different top-of-rack switches (ToR) are put together to form a cluster for reliability purpose, etc. In this invention, we use hop-count to gather servers into different clusters. Clusters are classified by their sizes (i.e., the number of servers in the clusters). The middle-boxes will be attached to a server cluster on-demand when the provider receives a VTN demand request from a tenant.

Up on receiving a VTN demand request, we begin to allocate resource to satisfy the demand. This process includes mapping the VTN to a specific cluster (Procedure 3) and assigning physical paths to the VTN.

Figure 3A:
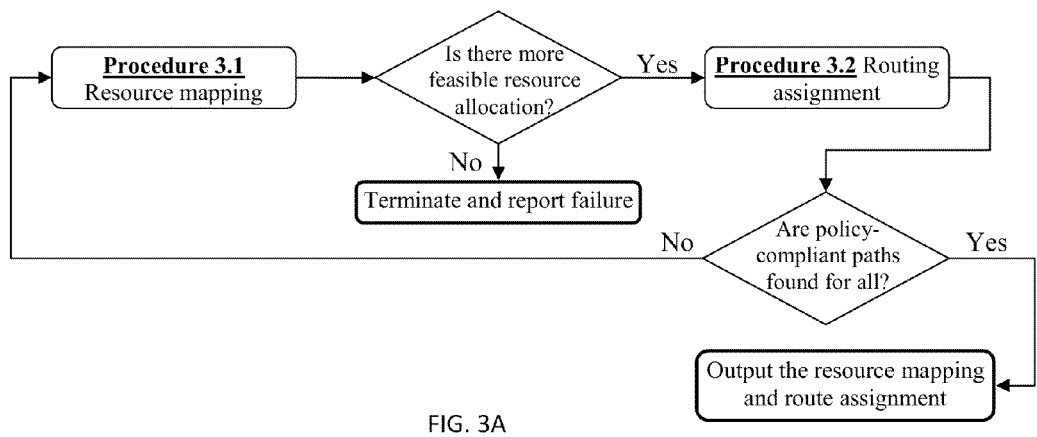
FIGS. 3A and 3B are diagrams showing resource mapping aspects of the invention.
Figure 3B:
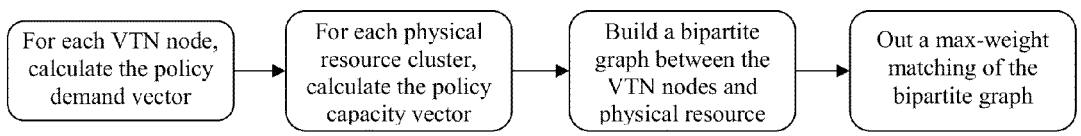

Turning now to FIGS. 3A and 3B showing diagram for the policy-aware VTN mapping, and a diagram for a step 2 procedure of the policy-aware VTN mapping. Procedure 3.1 enumerates all feasible resource mappings (bounded by a predetermined counter) and outputs the optimal mapping with policy-compliant routing paths. Referring to FIG. 3A, if after resource mapping, if there is a more feasibly resource allocation the routing assignment, procedure 3.2 is undertaken and if not a termination and reporting of a failure occur. After the routing assignment if policy compliant paths are found for all, the resource mapping and route assignment is outputted. Otherwise, the method loops back to the resource mapping procedure above.

Under the resource mapping procedure 3.1 shown in FIG. 3A the inventive method tries to map each node in the VTN graph to a physical server node in the cluster. In the VTN graph, each link 1 has a policy vector, say $<b_1,r_1,i_1>$, where $b_1$ is the bandwidth demand, $r_1$ means the VTN link must be mapped to $r_1$ disjoint physical paths in the physical topology, and $i_1$ means that any physical links which the VTN link is mapped to can only be shared by at most $i_1$ tenants.

Step 1: annotation. First, define some variables for each VTN node and physical cluster. For a VTN node, $b_v = \Sigma b_1$ is the sum of the bandwidth demands of VTN links incident to this node; $r_v = \max\{r_1\}$ is equal to maximal $r_1$ value of the VTN links incident to this node; and $i_v = \min\{i_1\}$ is equal to the minimal $i_1$ value of VTN links incident to this node. For a cluster node, $b_v$ is the sum of the available bandwidth of links incident to this node; $r_v$ is the maximal number of disjoint paths between this node and any other cluster node; and $i_1$ is the minimal number of tenants assigned on the links incident to this node. Then, we only try to map a VTN node to a cluster node if the policy demand vector $<b_{v1},r_{v1},i_{v1}>$ of the VTN node is smaller than the policy capacity vector $<b_{v2},r_{v2},i_{v2}>$ of the cluster node. Additional policies, such as middle box locations, can also be incorporated.

Step 2: In this step, the invention constructs a bipartite graph between the VTN nodes and the physical server cluster and find a mapping between the two sides. Note that in this bipartite graph, each link is assigned certain weight, which can be a function of the link utilization, tenant counts, reliability, etc. The diagram of FIG. 3B illustrates this procedure.

Specifically, referring to FIG. 3B, for each VTN node, the policy demand vector is calculated. For each physical resource cluster, the policy capacity vector is determined, followed by a build of a bipartite graph between the VTN nodes and physical resource cluster. Then there is an output of a max-weight matching of the bipartite graph.

Figure 4:
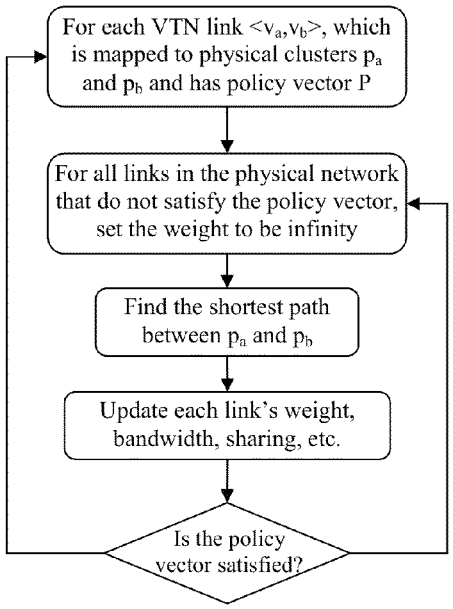
FIG. 4 is a diagram for routing assignment aspects of the invention.

Turn now to FIG. 4, showing the routing assignment under Procedure 3.2. Once the mapping is done, we assign physical path(s) for each VTN link iteratively based on the specified link policy vector. To do this, our scheme is to dynamically adjust the link weights (default value is 1) in the physical topology according to the policies and run the Dijkstra's shortest path algorithm once or multiple times to find the path(s) for the VTN link.

Initially, for each VTN link $<v_a,v_b>$, which is mapped to physical clusters $p_a$ and $P_b$ and has policy vector P. For all links in the physical network that do not satisfy the policy vector, set the weight to be infinity. Then there is a finding of the shortest path between $p_a$ and $p_b$. Then there is an update of each link's weight, bandwidth, sharing, etc. The method then checks if the policy vector is satisfied.

From the foregoing it can be appreciated that the VTN placement mechanism proposed in this invention systematically incorporates tenants policies (e.g., security, load balancing, reliability, and administration) into the VTN resource mapping and routing determination. The resulting placement can be more easily deployed in today's data centers. In addition, the implementation of our approach can be significantly facilitated by OpenFlow technologies. Therefore, this invention adds additional value to the OpenFlow technologies and can boost the sales and marketing of NEC's PFlow products and services.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiment shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A method for policy-aware mapping of an enterprise virtual tenant network (VTN), said method comprising the steps:
   receiving inputs from a hosting network and tenants, inputs from said hosting network including topology, capacities and locations of servers and appliances and inputs from said tenants including resource requirements and policies;
   translating resource demand and policies of said tenants into a network topology and bandwidth demand on each link in said network;

pre-arranging a physical resource of a physical topology for clustering servers on said network to form an allocation unit before a VTN allocation;

allocating resources of said hosting network to satisfy demand of said tenants in response to a VTN demand request; and conducting a policy aware VTN mapping for enumerating all feasibly resource mappings, bounded by a predetermined counter for outputting optimal mapping with policy-compliant routing paths in said hosting network;

wherein said VTN aware mapping comprises a resource mapping for deciding where to place each VTN resource in the hosting network;

wherein said resource mapping comprises first defining some variables for each VTN node and physical cluster;

wherein for a VTN node, $b_v = \Sigma b_1$ is the sum of the bandwidth demands of VTN links incident to this node; and $r_v = \max \{r_1\}$ is equal to maximal $r_1$ value of the VTN links incident to this node; and $i_v = \min \{i_1\}$ is equal to the minimal $i_1$ value of VTN links incident to this node, for a cluster node, $b_v$ is the sum of the available bandwidth of links incident to this node; $r_v$ is the maximal number of disjoint paths between this node and an other cluster node; and $i_1$ is the minimal number of tenants assigned on the links incident to this node, there is only a mapping of a VTN node to a cluster node if a policy demand vector $<b_{v1},r_{v1},i_{v1}>$ of said VTN node is smaller than the policy capacity vector $<b_{v2},r_{v2},i_{v2}>$ of the cluster node.

2. The method of claim 1, wherein, in said VTN graph, each link has a policy vector node in said cluster, with a link $<b_1,r_1,i_1>$, $b_1$ is the bandwidth demand, $r_1$ means the VTN link must be mapped to $r_1$ disjoint physical paths in the physical topology, and $i_1$ means that any physical links which the VTN link is mapped to can only be shared by at most $i_1$ tenants.

3. The method of claim 1, wherein said resource mapping comprises constructing a bipartite graph between VTN nodes and a physical server cluster and finding a mapping between the two sides, in said bipartite graph, each link being assigned a certain weight.

4. The method of claim 3, wherein said certain weight comprises being a function of a link utilization, tenant counts, reliability.

5. The method of claim 1, wherein said VTN aware mapping comprises a routing assignment for determining an optimal forwarding path for each virtual link in said VTN while preserving all associated policies.

6. The method of claim 5, wherein said routing assignment comprises assigning physical path(s) for each VTN link iteratively based on a specified link policy vector.

7. The method of claim 6, wherein said routing assignment comprises dynamically adjusting link weights, default value being 1, in said physical topology according to policies and running a Dijkstra's shortest path process once or multiple times to find path(s) for said VTN link.

8. The method of claim 5, wherein said routing assignment comprises for each VTN link $<v_a,v_b>$, which is mapped to physical clusters $p_a$ and $p_b$ and has policy vector P and for all links in the physical network that do not satisfy the policy vector, setting a weight to be infinity;

finding a shortest path between $p_a$ and $p_b$;

updating each link's weight, bandwidth, sharing; and checking if the policy vector is satisfied.

\* \* \* \* \*